United States Patent [19]

Roussin

[11] Patent Number: 4,779,024
[45] Date of Patent: Oct. 18, 1988

[54] DEFLECTION SYSTEM FOR LIGHT VALVE PROJECTORS OF THE SCHLIEREN DARK FIELD TYPE

[75] Inventor: Alfred G. Roussin, Syracuse, N.Y.

[73] Assignee: General Electric Company, Philadelphia, Pa.

[21] Appl. No.: 901,065

[22] Filed: Aug. 26, 1986

[51] Int. Cl.$^4$ ............... H01J 29/64; H01J 29/74
[52] U.S. Cl. ............................ 313/432; 313/427; 313/439; 313/117; 313/111; 315/391; 315/395; 315/15; 358/62
[58] Field of Search ............ 315/15, 382, 382.1, 315/391, 395; 313/413, 414, 449, 465, 111, 117, 427, 432, 439; 358/60, 62; 350/361

[56] References Cited

U.S. PATENT DOCUMENTS

| | | | |
|---|---|---|---|
| 3,065,295 | 11/1962 | Glenn, Jr. | 358/62 |
| 3,078,338 | 2/1963 | Glenn, Jr. | 358/62 |
| 3,134,852 | 5/1964 | Glenn, Jr. et al. | 358/62 |
| 3,385,923 | 5/1968 | Vanderlaan et al. | 358/62 |
| 3,437,746 | 4/1969 | Good et al. | 358/62 |
| 3,730,992 | 5/1973 | True | 358/62 |
| 3,806,636 | 4/1974 | True et al. | 358/62 |

*Primary Examiner*—David K. Moore
*Assistant Examiner*—Mark R. Powell
*Attorney, Agent, or Firm*—Stephen A. Young; Paul Checkovich

[57] ABSTRACT

An improved electron deflection system for a light valve of the type used in Schlieren dark field projectors is disclosed. The deflection system eliminates one set (D box 25) of three sets of deflection electrodes used in such projectors. This is accomplished by modifying the d.c. voltages and a.c. voltages applied to the deflection electrodes. A quadrupole d.c. voltage is added to the first control box set of electrodes (61, 62) and a second quadrupole voltage of opposite sense is added to the focus deflection box set of electrodes (63, 65). This modifies the vertical and horizontal beam angles differentially and the vertical and horizontal beam trajectories differentially in a manner to compensate for the composite effects of spherical aberrations, deflection focusing aberrations, and the static starfish lens generated by the interaction of the square box electrode structure against the round drift ring assembly (21) of the deflection system.

7 Claims, 4 Drawing Sheets

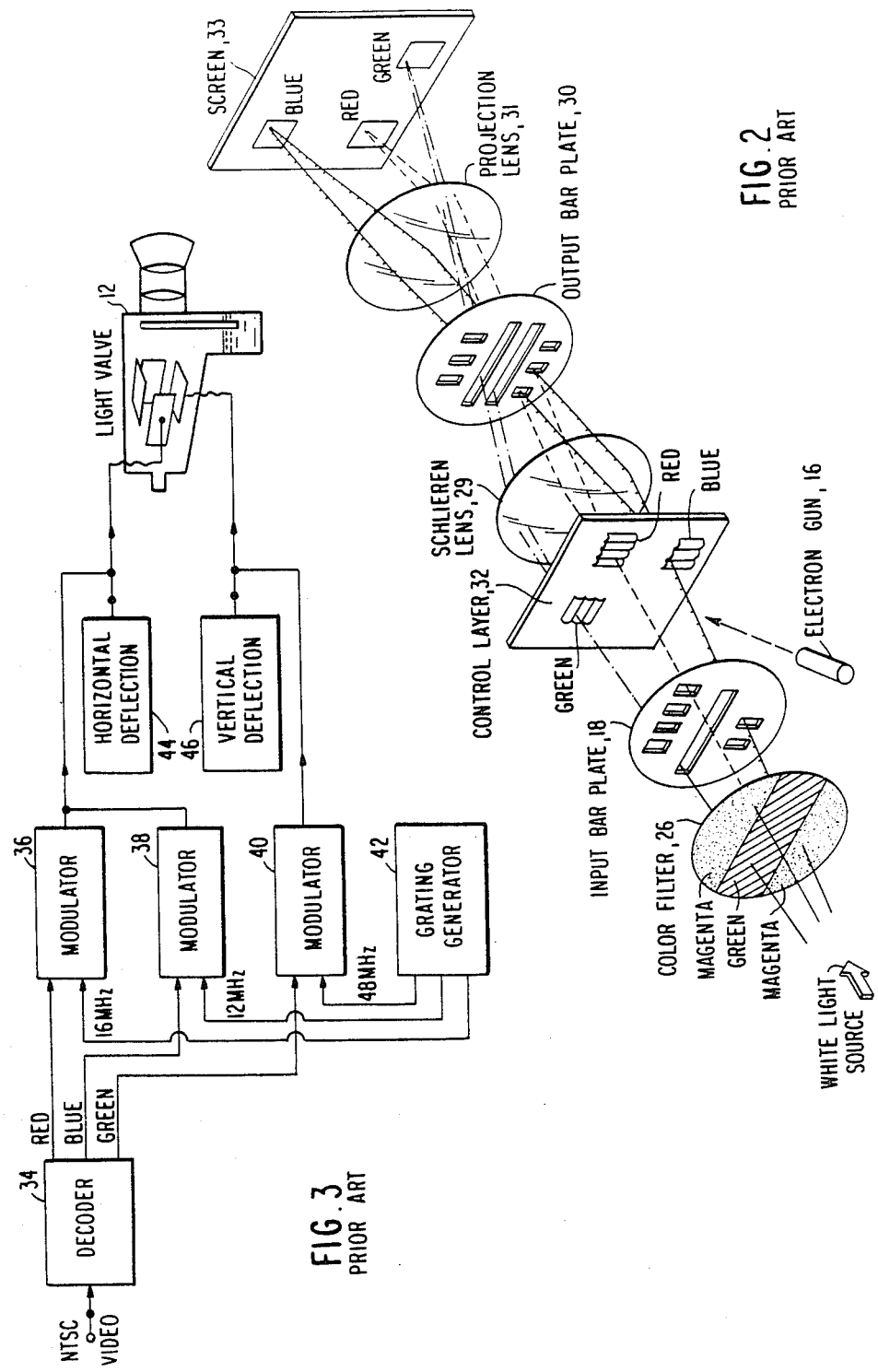

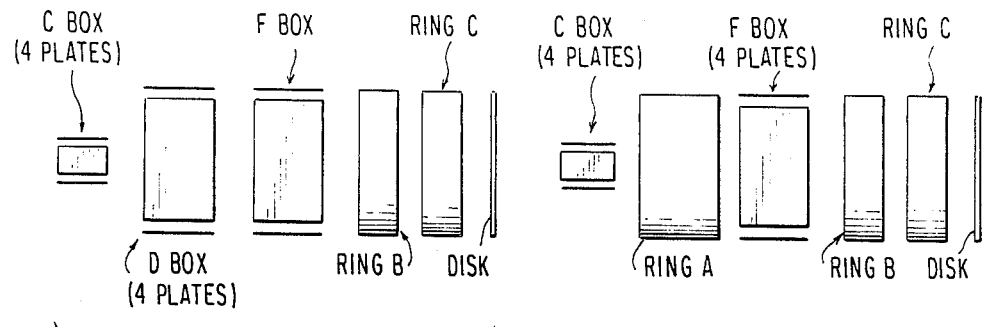
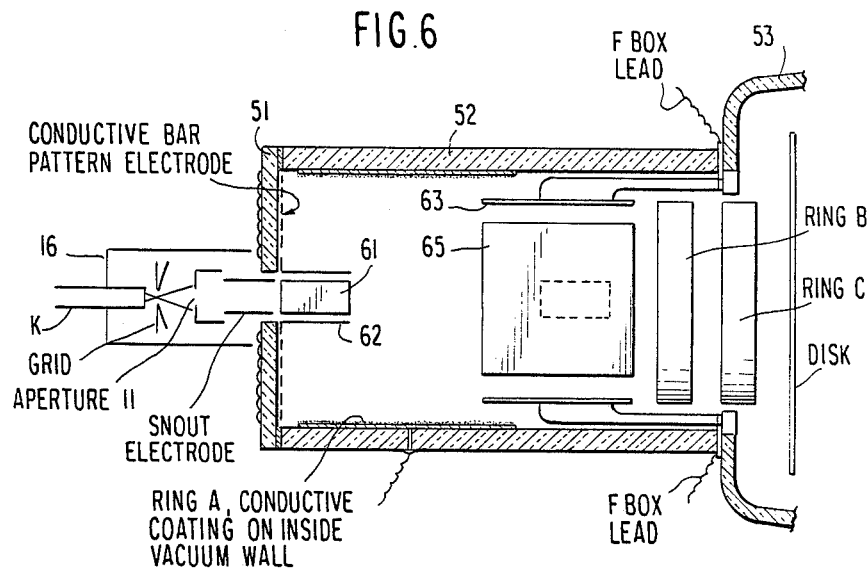

DEFLECTION SYSTEM FOR LIGHT VALVE PROJECTORS OF THE SCHLIEREN DARK FIELD TYPE

BACKGROUND OF THE INVENTION

1. Field of the Invention

The present invention generally relates to improvements in light valve projection systems of the Schlieren dark field type and, more particularly, to improvements in the deflection system which simplify the construction and improve the performance of such light valves.

2. Description of the Prior Art

Light valve projection systems of the Schlieren dark field type have been in commercial use for many years and are capable of providing excellent performance. Typical prior art color projection systems of this type are shown in U.S. Pat. Nos. 3,290,436, 3,352,592 and 3,437,746, all of which were issued to W. E. Good et al. The principles of operation of this type of projection system are briefly described with reference to FIGS. 1, 2 and 3 of the drawings.

With reference first to FIG. 1, there is schematically shown a single-gun television light valve assembly comprising a lamp 10, sealed light valve 12, and Schlieren projection lens 14. The sealed light valve 12 comprises a glass envelope which contains an electron gun 16, input slots 18, focus-deflection system 20, a control layer 32 on a rotating disk 22, and a fluid reservoir 24.

The electron gun 16 generates, from anode aperture 11, an electron beam which is used to "write" charge patterns on the control layer 32. These patterns create surface deformations in the layer and form light diffraction gratings. In prior art devices, the electron beam is focused, deflected, and modulated by electrodes 23, 25, 27, and 21. The control layer surface deformations diffract and modulate the light rays passing through the layer 32 and disk 22.

The focus-deflection system 20 comprises three electrode sets each having four ortogonal electrodes, which form three electrode "boxes", referred to as C, D and F boxes 23, 25 and 27, respectively, and a cylindrical electrode 21. The first of these, C box 23, is arranged about the aperture in the input window and serves to center and allow pre-deflection of the electron beam. The next two boxes, the D and F boxes 25 and 27, have d.c. and a.c. voltages applied to them in a manner to achieve a uniformly focused electron beam image of aperture 11 which is scanned across the raster plane on control layer 32. This, in turn, permits the control layer fluid to be modulated uniformly by charge control to produce a uniformly colored projected image. Following the D and F focus deflection boxes 25 and 27 is a drift ring 21 which serves, with a transparent electrode on disk 22, as an element of the final electron lens in the focus deflection system 20.

Specific examples of light modulating fluids are disclosed in U.S. Pat. Nos. 3,288,927 to Ralph W. Plump, 3,317,664 and 3,317,665 both to Edward F. Perlowski, Jr., 3,541,992 to Carlyle S. Herrick et al, and 3,761,616 issued to C. E. Timberlake. These fluids may include additives as taught by 3,764,549 and 3,928,394 to David A. Orser. In general, the control layer or light modulating fluid is a very special chemical compound, modified with special additives, having the electro-mechanical and visco-elastic properties needed to produce effective control layer properties in the electron beam addressed light valve.

The basic light collection system includes an arc lamp 10, which may be a Xenon lamp, the arc of which is located at the focus of a reflector system, which may be a simple ellipsoidal reflector, as shown, or a compound reflector, as disclosed for example in U.S. Pat. No. 4,305,099 to Thomas T. True et al. The light from the arc is reflected from the reflector through a pair of spaced lens plates having corresponding pluralities of rectangular lenticules arranged in horizontal rows and vertical columns. The first lens plate is shown in FIG. 1 at 28 and the second lens plate is formed on the light input surface of the glass envelope of the light valve 12. The light from the lamp 10 is projected through a color filter plate 26 and the lenticular lens 28 before entering the light valve 12.

The interior surface of the glass envelope of the light valve 12 carries the input light mask in the form of slots 18 which, for example, may be applied by vapor deposition. The input slots 18 are a series of transparent slots and alternating opaque bars in a pattern generally as indicated in FIG. 1. The filtered light rays from the lamp 10 pass into the light valve 12 through these transparent slots. The lenslets of the lenticular lens 28 and the corresponding lenslets, formed on the light input surface of the glass envelope of the light valve 12, form condensing lens pairs which first focus spots of filtered light onto the slots of the light mask and then re-image the light rays onto the control layer raster plane 32. With this arrangement, efficient utilization is made of light from the arc lamp, and uniform distribution of light is produced, in a rectangular pattern, on the light modulating medium or control layer 32.

The Schlieren projection lens 14 includes Schlieren lens elements 29, output color selection bars 30 and a projection lens system 31. The output selection bars 30 are the complement of the input slots 18. That is, on the output bar plate, the bars are optically aligned with the slots of the input slots 18 so that, in the absence of a diffraction of light passing through the control layer 32, light rays are focused and terminated on the bars of the output bar plate. This creates a "dark field" condition, i.e., no light is transmitted in the absence of a modulating signal superimposed on the raster scanning signals applied to the horizontal and vertical deflection plates of the deflection system 20. It should be noted, however, that the electron beam which scans the raster and provides charge to the control layer is a constant current electron beam, there being no modulation of the intensity of the beam produced by the electon gun 16 (other than during the horizontal and vertical retrace intervals when the beam is off).

The lower half of FIG. 1 shows the cross sections of the light body and light valve components. The spectral diagrams at the bottom indicate how the light is prefiltered before entering the light valve.

FIG. 2 is a simplified light valve diagram showing the color selection action of the three basic gratings. The control layer 32 which is supported by the rotating disk 22 (shown in FIG. 1) is illustrated as having three different diffraction gratings for red, green and blue light components. These diffraction gratings may be written individually or simultaneously and normally are actually superimposed but, for purposes of illustration only, they are shown in FIG. 2 as separated on the control layer 32.

In the light valve projection system shown in FIGS. 1 and 2, green light is passed through the horizontal slots of the input bar plate 18 and is controlled by diffraction gratings formed by modulating the height of the scanned raster lines on the control layer 32. This is done by controlling the amplitude of a high frequency carrier applied to the vertical deflection plates as modulated by the green video signal as shown in FIG. 3. Magenta (red and blue) light is passed through the vertical slots of the input bar plate 18 and is controlled by charge generated diffraction gratings created at right angles to the raster lines by velocity modulating the electron spot as it is scanned in the horizontal direction. In the example shown in FIG. 3, this is done by applying a 16 MHz (12 MHz for blue) signal to the horizontal deflection plates and modulating it with the red video signal as shown in FIG. 3. The grooves created in the control layer 32 have the proper spacing to diffract the red portion of the spectrum through the vertical output slots in plate 30 while the blue portion is blocked. (When the 12 MHz carrier is used, the blue light is passed by the vertical slots in plate 30 and the red light is blocked.)

Thus, three simultaneous and superimposed primary color pictures can be written with the same electron beam and projected to the screen 33 as a completely registered full color picture. Colors are created by writing miniture diffraction gratings within each picture element on the fluid surface by manipulating the single scanning electron beam. These gratings diffract the transmitted light rays away from their terminations at the output bars where they are spatially filtered to let the desired color reach the screen. The amount of light diffracted is dependent on the depth of the gratings formed in the control layer. This technique permits a full color television picture to be written on a single control layer with no need for further registration.

FIG. 3 shows in block diagram form the basic light valve projector circuitry. A composite video signal is supplied to the input of a decoder 34 which provides at its output red, blue and green video signals. These signals are respectively applied to modulators 36, 38 and 40. A grating generator 42 supplies carrier signals which, in the case illustrated, have frequencies of 16 MHz and 12 MHz, respectively, to modulators 36 and 38 and a signal having a frequency of 48 MHz to modulator 40. The outputs of the red and blue modulators 36 and 38 are combined and superimposed on the horizontal deflection signal from the horizontal deflection signal generator 44. The output of the green modulator 40 is superimposed on the vertical deflection signal from the vertical deflection generator 46.

The basic Schlieren dark field light valve projector as schematically illustrated in FIGS. 1, 2 and 3 has evolved over a period of years to be a highly efficient projector producing excellent quality pictures of good color balance and high resolution. Nevertheless, there is a continuing quest to simplify the construction, and thereby reduce the cost of production, of the light valve without a consequent deterioration in performance.

SUMMARY OF THE INVENTION

It is an object of this invention to provide improvements in the design and manufacture of light valve projection systems of the Schlieren dark field type.

It is another and more specific object of the subject invention to provide a simplified deflection system for such light valves.

It is a further object of the present invention to provide a deflection system for light valves of the Schlieren dark field type in which the effects of spherical aberrations and deflection focusing aberrations are substantially reduced.

It is yet another object of this invention to provide a deflection system for light valves of the type described which is less expensive to produce yet does not sacrifice the quality of the projected image.

According to the invention, the basic light valve deflection system is modified to eliminate one of the three sets of electrode boxes currently used. This is accomplished by modifying the applied d.c. voltages and a.c. voltages applied to the remaining two deflection boxes. A static push-push quadrupole d.c. voltage is impressed on the centering electrodes on the input window. The two vertical plates receive equal negative voltages, and the two horizontal plates receive equal positive voltages. The next set of deflection plates receive opposing push-push d.c. quadrupole voltages to bring the horizontal and vertical dimensions of the imaged spot to focus in a common plane. These lenses compensate for the composite effects of spherical aberrations, deflection focusing aberrations, and interact with the static starfish lens generated by the interaction of the square deflection box electrodes and the round drift ring.

By eliminating one set of deflection plates, there is a resultant simplification in manufacturing due to the fact that fewer plates are required and voltage connections are eliminated. Furthermore, there also results a significant decrease in alignment effort, all of which contributes to a reduction in the cost of production.

BRIEF DESCRIPTION OF THE DRAWINGS

The foregoing and other objects, aspects and advantages of the invention will be better understood from the following detailed description with reference to the drawings, in which:

FIG. 2 is a simplified perspective view illustrating the principles of operation of the prior art light valve projection system;

FIG. 3 is a block diagram showing the basic circuitry of a modulated deflection system of the prior art light valve projection system;

FIGS. 5A and 5B, respectively, are simplified plan views of the old twelve plate deflection system and the new eight plate deflection system according to the invention; and FIG. 6 is a cross-sectional view of the light valve shown in FIG. 4 showing in greater detail the new eight plate deflection system according to the invention.

DETAILED DESCRIPTION OF THE PREFERRED EMBODIMENT OF THE INVENTION

Figure 4:
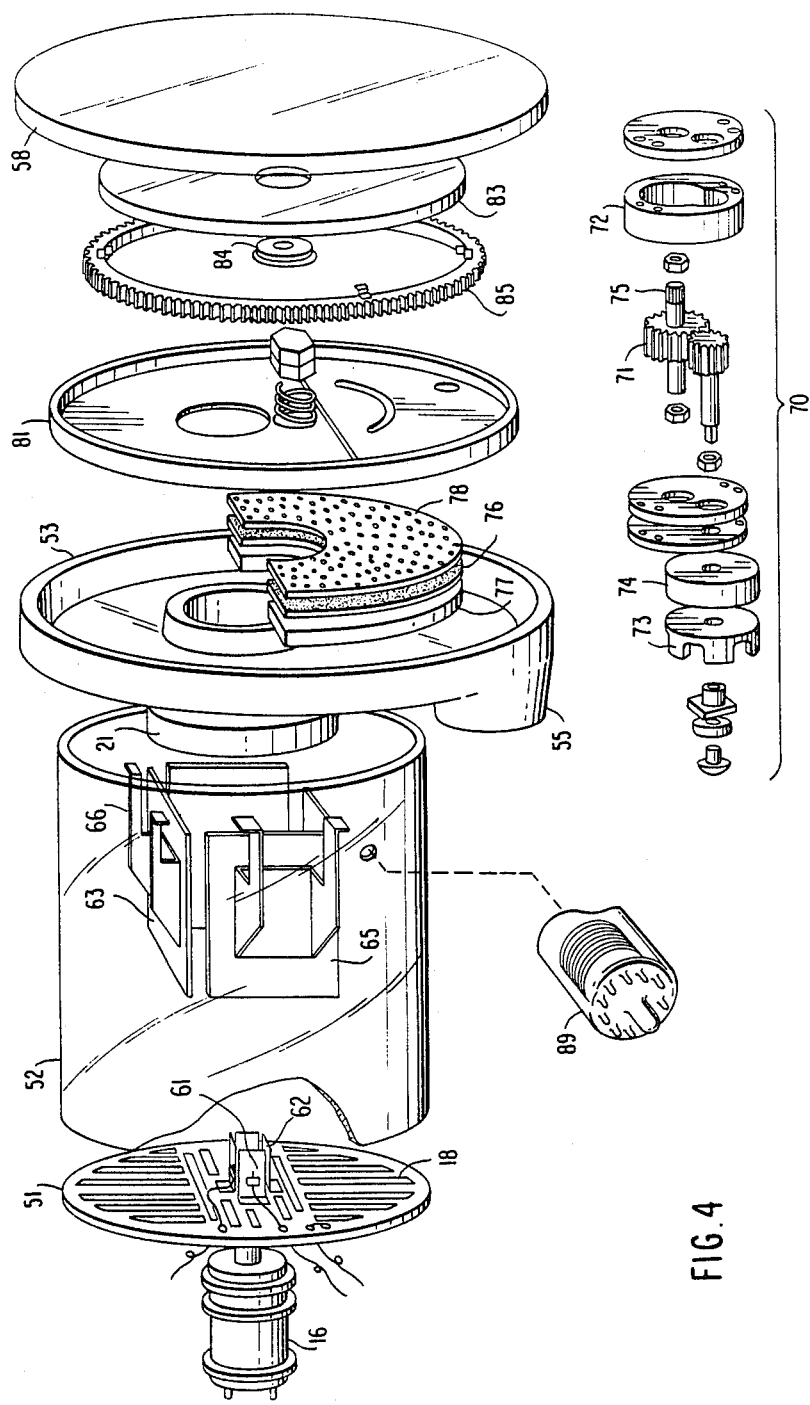
FIG. 4 is an exploded perspective view of major elements of a new generation of light valves which embody the invention.

In the drawings, like reference numerals used in the several figures indicate the same or corresponding components. Referring again to the drawings, and more particularly to FIG. 4, there is shown an exploded view of the internal vacuum components of the new generation Schlieren dark field light valves. The vacuum enclosure comprises an input window 51, a focus deflection cylinder 52, a rear housing 53 which has a molded recess 55 for receiving a pump assembly 70, and a face plate 58. The electron gun assembly 16 is attached to a central aperture of the input window 51, and the input slots or bar plate 18 are formed on the interior surface of the input window 51, functionally similar to the earlier light valves of this type.

The focus and deflection assembly comprises two sets of electrodes where formerly there had been three sets of electrodes (see FIG. 5A). Basically, the D box set of four electrodes has been eliminated, while the C box and F box sets of electrodes have been retained. The C box set of four electrodes, comprising a pair of horizontal plates 61 and a pair of vertical plates 62, is attached to the input window 51 about the central aperture thereof. According to one aspect of the present invention, a static push-push quadrupole d.c. voltage is added to this first set of electrodes. The two vertical plates 62 receive an incremental $-60$ volts equally, and the two horizontal plates 61 receive an incremental $+60$ volts equally. These values are exemplary, since it will be understood by those skilled in the art that the precise value of the quadrupole voltages will differ for different d.c. profiles of the following deflection box, the drift ring and disk voltages. A pair of vertical deflection plates 63 and a pair of horizontal deflection plates 65 located within the cylinder 52 form the second set of deflection plates. These are the F box set of electrodes. As in the case of the electrodes 61 and 62, an opposing push-push d.c. quadrupole voltage is applied to the deflection plates 63 and 65 to bring the horizontal and vertical beam image into a common focal plane. Those skilled in the art will recognize that the effect of the quadrupole voltages applied to the electrodes 61 and 62 and the deflection electrodes 63 and 65 is to generate two crossed cylindrical lenses. The effect of these two lenses is to decrease the magnitude of the opposite curvatures of field of the horizontal and vertical spot dimensions.

As shown in FIG. 4, the F box deflection plates 63 and 65 are supported within the cylinder 52 by means of brackets 66 which also provide the electrical connections to the deflection plates. Beyond the deflection plates 63 and 65 and within the rear housing 53 is a cylindrical drift ring assembly 68 which, with a transparent electrode on disk 83, completes the focus deflection system. In FIG. 4, only one drift ring of the drift ring assembly is shown, but a split drift ring assembly is used. This split drift ring assembly is described in more detail in my copending application Ser. No. 06/883,214 filed July 8,1986, entitled "Split Drift Ring for Focus Deflection in Light Valves" and assigned to a common assignee with this application. Not shown in FIG. 4 is a cylindrical electrode in the form of a vacuum deposited metallic film on the inside surface of the cylinder 52. This cylindrical electrode, referred to hereinafter as ring A, is an important part of the invention and is described in more detail with reference to FIGS. 5B and 6.

A gear pump assembly, generally indicated at 70, is located within recess 55 of the rear housing 53. The gear pump comprises gears 71 within a housing 72 driven by a magnet 73. The magnet 73 is coupled to a rotating magnet driven by an electric motor (not shown) axially aligned with the pump 70 on the exterior rear face of the recess 55 that houses the pump. An axial shield 74 is provided for the magnet 73 so that its magnetic field does not affect the electron beam. Other magnetic shielding is provided within the light valve projection system to prevent the electron beam from being affected by magnetic fields at the projector or due to the earth's magnetic field.

Figure 1:
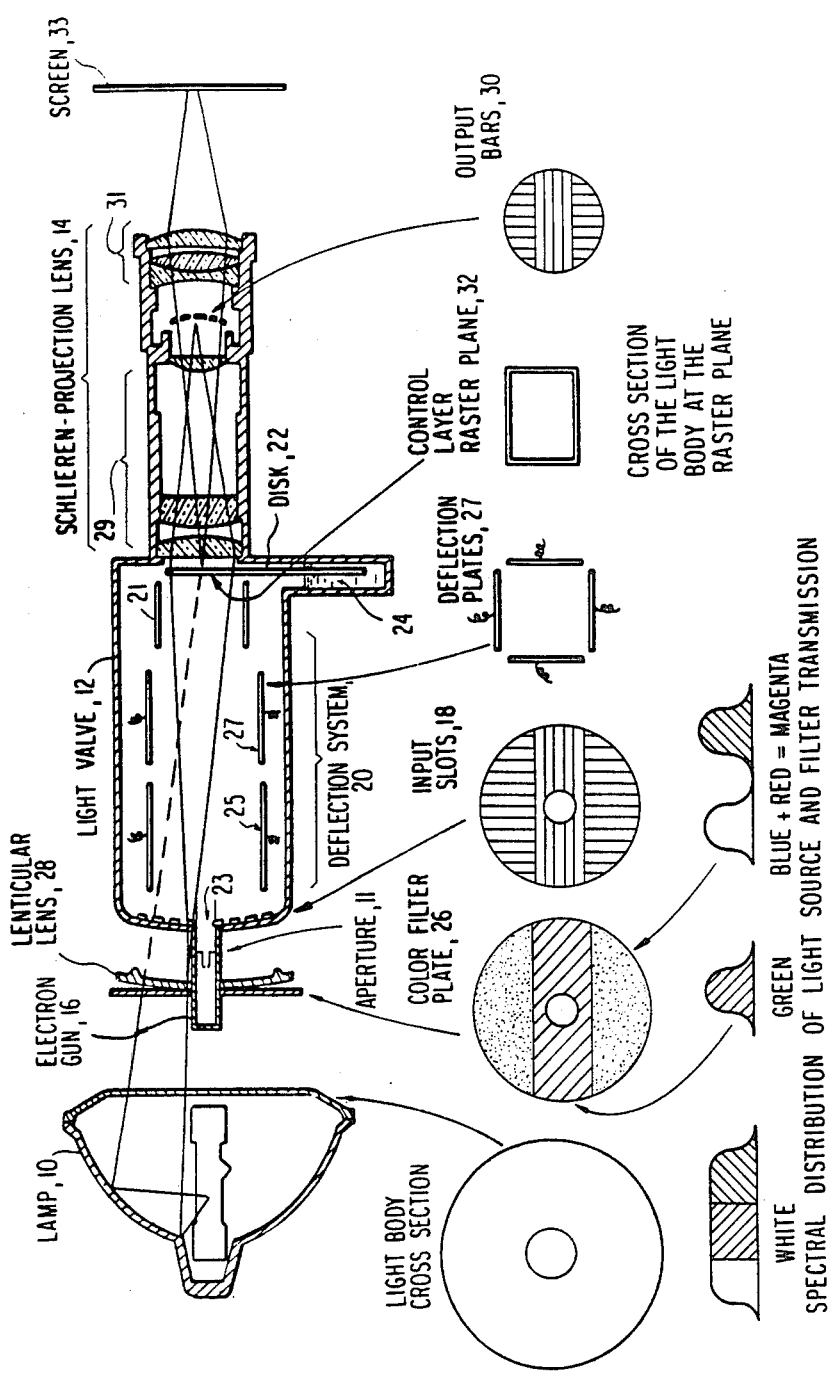
FIG. 1 is a simplified cross-sectional view showing the construction of a prior art light valve projection system.

The rear housing 53, including the recess 55 which houses the pump assembly 70, and the face plate 58 generally define the reservoir 24 (schematically illustrated in FIG. 1) which contains the fluid. The gear pump 70 is located in that reservoir and operates to pump the fluid through a filter 76. The filter 76 is sandwiched between a filter housing 77 and a perforated panel 78, and this assembly is secured to the lower rear face of a baffle 81. The baffle 81 is a generally circular disk with a forwardly projecting flange which surrounds the rotating disk 83. The disk 83 is supported for rotation by a bearing 84 through which projects a pin mounted in the center of baffle 81. A ring gear 85 is attached to the peripheral edge of the disk 83 and is driven by a pinion gear 75 that projects from the gear pump 70.

Attached to the side of the cylinder 52 is a vacuum maintenance device 89, which collects gaseous materials remaining in the envelope after it is sealed and which are generated as a product of the operation of the light valve.

FIGS. 5A and 5B contrast the difference between the old focus deflection and the new deflection system according to the present invention. The light valve focus deflection system, shown in FIG. 5A as consisting of three boxes (labeled C box, D box and F box) of four plates each and a terminating region consisting of two electrically separate axial drift rings and the target disk electrode, has been simplified to an assembly, shown in FIG. 5B, consisting of a set of two boxes, C and F, arranged in a sequential manner and a terminating region of two drift rings and the target disk electrode. Thus, the D box with its four electrically separate electrodes and four feedthrough wires and additional external wiring has been replaced with a single cylinder labeled ring A in FIG. 5B.

In one embodiment of the invention, ring A consists of a conductive coating on the internal surface of the cylinder 52, as shown in FIG. 6. In effect, the D box set of four electrodes has been replaced by the conductive coating on the vacuum wall of the light valve with but a single lead brought out of the envelope for circuitry connection. Full electron optical performance of raster deflection and uniform beam focus over the scanned area is achieved by using new valuesfor the d.c. potentials applied to the modified electrode assemblies and new amplitudes of deflection waveforms applied to the remaining C box and F box electrode sets.

In the old twelve plate system (FIG. 5A), the aperture 11 in the anode is operated at 7200 volts d.c. The aperture 11 is illuminated by the cathode current $I_k$. The small aperture 11 passes approximately five microamperes of current when the anode is illuminated by approximately 1.2 amperes/cm$^2$. The aperture forms the electron optical object which is focused as a demagnified image at the raster plane with uniform focus over the raster area by suitable vertical and horizontal deflection waveforms on the C box, D box, and F box electrodes in conjunction with suitable focusing d.c. voltages on the snout electrode of the electron gun, the input bar electrode, the C box electrodes, the F box electrodes, ring B, ring C, and the disk electrode. A major requirement for the twelve plate system is that the off axis beam trajectories must enter the F box at a radial displacement and included angle with the system axis to traverse a trajectory path through the F box which encounters first deflection distortion fields and then compensatory beam distortion fields which cancel each other. The first fields are caused by the off axis deflection fields, and the compensating fields are provided by the static fields generated by ring B applied voltage in interaction with the square F box voltage. The beam entry trajectory into the F box region is determined by the predeflection sweeps applied to the C and D box electrodes. This predeflection entry trajectory is critical to determining the electron path which possesses the compensation distortions through the F box and the $R_B$ and $R_C$ drift rings.

When the D box is removed, the C box alone can no longer provide the required entry path into the F box and drift ring region which will provide compensating distortions. Electrical applied voltage modifications were made for the eight plate design according to the invention to both alter the compensating fields in the static lens determined by the $R_B$ drift ring and the F box and to also modify the entry trajectory as determined by the C box sweeps and the new A ring to F box entry static lens fields in order to provide a new set of entry trajectories which matched the new exit trajectories through the F box and the $R_B$ and $R_C$ ring space. It was determined empirically that the 3.5 inch conductive coating which forms ring A could be varied in d.c. voltage to provide a lens in this space which, in conjuction with the new values of predeflection sweeps on the C box, can selectively alter the entry position and angle of the trajectories entering the F box to match the compensation paths the trajectories must follow through the F box and $R_B$ and $R_C$ space.

The required aberration compensating exit paths can be controlled by the d.c. voltage value on the $R_B$ drift ring to alter the static starfish lens formed by the $R_B$ drift ring and the F box electrodes. Thus, empirically, a best uniform focus can be obtained by varying the A ring voltage, the B ring voltage, and the predeflection sweeps applied to the C box electrodes. In addition to resetting the above voltages and sweep values to achieve optimized spot uniformity over the scanned raster area, additional improvements are obtained by changing the voltage on the snout electrode of the electron gun from its normally applied value of 7.2 KV in the old twelve plate system which, in conjunction with the adjacent anode electrode at 7.2 KV, results in a field free (i.e., no focusing) path from the aperture 11 to an axial point well into the A ring space, to a voltage below 7.2 KV, such as 5.0 KV, to form a positive spherical lens in the snout electrode region. The resulting snout electrode lens decreases the beam divergence such that its diameter when it arrives at the F box space is reduced. The aberrations of concern increase as the third power of the beam diameter in this F box region. Hence, a small decrease in beam diameter results in large decreases in aberrations, which in turn results in reduced dependence on critically matching compensating aberrations. This effect is used to advantage to decrease dependence on critical trajectory path entry into the F box region.

An additional electrical operating voltage modification was made to the operating focus deflection system in the form of static quadrupole voltages applied to the C box electrodes 61 and 62. The vertical deflection pair of electrodes 62 are operated at +7140 volts d.c. each, and the horizontal deflection pair of electrodes 61 are operated at +7260 volts d.c. each. The resulting differential electric fields form quadrupole lenses along the C box axial space. The applied polarities result in the vertical spot dimension achieving focus sooner than the horizontal spot dimensions when symmetrical focus d.c. voltages are applied to the F box electrodes 63 and 65. Hence, a compensating quadrupole lens (to the C box cross cylinder lenses) is formed in the F box by applying a suitable positive incremental d.c. voltage to the vertical F box electrodes 63, with an equal value of negative incremental voltage to the horizontal F box electrodes 65. The combined action of the tandem arrangement of quadrupole lenses in the C and F box regions results in a further improvement to the required uniform spot size over the scanned area.

Summarizing, for the preferred embodiment of the invention, the following voltage and dimensions have been empirically determined:

| | |
|---|---|
| electron gun snout electrode voltage | +5000 volts |
| A ring electrode voltage | +7000 to 9000 volts |
| A ring diameter | 3.5 inches |
| C box electrodes voltage nominal | +7000 volts |
| horizontal plates incremental voltage | +60 volts |
| vertical plates incremental voltage | −60 volts |
| axial length | 0.6 inches |
| interelectrode distance | 0.4 inches |
| F box electrodes voltage nominal | +30 volts |
| horizontal plates incremental voltage | 0 volts |
| vertical plates incremental voltage | +60 volts |
| axial length | 2.6 inches |
| interelectrode distance | 2.4 inches |
| 1st drift ring voltage | +4000 to 5000 volts |
| 1st drift ring diameter | 2.9 inches |
| 2nd drift ring voltage | +5000 to 7000 volts |
| 2nd drift ring diameter | 2.9 inches |
| beam landing electrode voltage | +4000 to 6000 volts | distance from beam shaping aperture to entrance of C box electrodes 1.5 inches distance from exit of C box electrodes to entrance of F box electrodes 1.9 inches distances between F box electrodes, 1st and 2nd drift rings and beam landing electrode each 100 mils More generally, the length of the first set of electrodes is 1.2 to 1.8 times the interelectrode spacing between the first set of electrodes, the length of the second set of electrodes is 1.0 to 1.6 times the interelectrode spacing of the second set of electrodes, the spacing from the beam shaping aperture to the entrance of the rirst set of electrodes is 0.5 to 2.5 inches, the spacing from the exit of the first set of electrodes to the entrance to the second set of electrodes is 3 to 6 times the interelectrode spacing of the first set of electrodes, the diameter of the cylindrical electrode is 6 to 10 times the interelectrode spacing of the first set of electrodes, and the diameters of the drift rings are 1.1 to 1.25 times the interelectrode spacing of the second set of electrodes.

Thus, the D box set of electrodes was successfully eliminated by (a) replacing it with an essentially spherical lens cylinder electrode, ring A, interacting with the F box entry plane and adjusting its voltage to optimize the entry trajectories, (b) altering the predeflection sweeps values on the C box electrodes to work in conjunction with the ring A to F box lens, (c) reducing the beam diameter as it proceeds to the focus deflection space by forming a positive lens in the gun by reducing the snout electrode voltage to a suitable value, (d) adjusting the $R_B$ ring voltage to an empirically determined value to provide a best compensating trajectory path through this region, and (e) finally, adding tandem quadrupole lenses of the indicated polarities to the C box region and the F box region to alter the horizontal and vertical beam diameters and trajectories in opposite directions to obtain further compensation for the opposite curvatures of field caused by the deflection waveforms.

These interactive electrical readjustments to the modified eight plate assembly according to the present invention all work to reduce and/or compensate for the off axis beam aberrations to a level sufficient for obtaining a spot size uniformity over the raster area in both vertical and horizontal dimensions which are adequate to obtain uniform modulation efficiency over the raster area.

While the invention has been described in terms of a specific preferred embodiment, those skilled in the art will recognize that the invention can be practiced with modification within the spirit and scope of the appended claims.

Having thus described my invention, what I claim as new and desire to secure by Letters Patent is as follows:

1. An improved electrostatic electron optical system for imaging an electron beam object formed at a beam shaping aperture and sweeping said beam over a scanned raster area while maintainingboth beam magnification and focus over the entire scanned area comprising:
   a deflection electrode assembly consisting of a first set of four control electrodes, a cylindrical electrode and a second set of four deflection electrodes, said cylindrical electrode being along an axis of said deflection electrode assembly and located between said first and second sets of four electrodes, each of said sets of four electrodes having a pair of vertical deflection plates and a pair of horizontal deflection plates;
   means for applying incremental d.c. voltages to the vertical deflection plates of said first set and equal but opposite polarity incremental d.c. voltages to the horizontal deflection plates of said first set;
   means for applying incremental d.c. voltages of polarity opposite the polarity of said first set to the vertical deflection plates of said second set and equal but opposite polarity incremental d.c. voltages to the horizontal deflection plates of said second set;
   a multi-element drift ring assembly axially aligned with said deflection electrode assembly; and
   a beam landing electrode axially displaced from said electrode assembly.

2. The improved electrostatic electron optical system as recited in claim 1 wherein said beam shaping aperture has a rectangular cross-section.

3. The improved electrostatic electron optical system as recited in claim 1 wherein the length of the first set of electrodes is 1.2 to 1.8 times the interelectrode spacing of said first set, the length of the second set of electrodes is 1.0 to 1.6 times the interelectrode spacing of said second set, the spacing from the beam shaping aperture to the entrance of the first set of electrodes is 0.5 to 2.5 inches, the spacing from the exit of the first set of electrodes to the entrance to the second set of electrodes is 3 to 6 times the interelectrode spacing of the first set, the diameter of the cylindrical electrode is 6 to 10 times the interelectrode spacing of the first set of electrodes, and the diameters of the first and second drift rings are 1.1 to 1.25 times the interelectrode spacing of the second set of electrddes.

4. The improved electrostatic electron optical system as recited in claim 1 wherein said multi-element drift ring assembly comprises first and second drift rings and further comprising an electron gun axially aligned with said deflection electrode assembly for generating an electron beam directed toward said beam landing electrode, said electron gun having a snout electrode at about 5000 volts d.c., said first set of electrodes operating at a nominal +7000 volts d.c. with incremental voltages of +60 volts on the horizontal deflection plates and −60 volts on the vertcial deflection plates, said second set of electrodes operating at a nominal +30 volts d.c. with 0 volts on the horizontal deflection plates and +60 volts on the vertical deflection plates, said cylindrical electrode operating in the range of 7000 to 9000 volts d.c., the first drift ring operating in the range of +4000 to 5000 volts d.c. and the second drift ring operating in the range of +5000 to 7000 volts d.c., and the beam landing electrode operating in the range of +4000 to 6000 volts d.c.

5. The improved electrostatic electron optical system as recited in claim 4 wherein the length of the first set of electrodes is 0.6 inches, the interelectrode spacing between the first set of electrodes is 0.4 inches, the length of the second set of electrodes is 2.6 inches, the interelectrode spacing between the second set of electrodes is 2.4 inches, the spacing from the beam shaping aperture to the entrance of the first set of electrodes is 1.5 inches, the spacing from the exit of the first set of electrodes to he entrance to the second set of electrodes is 1.9 inches, the diameter of the cylindrical elecrtrode is 3.5 inches, the diameters of the first and second drift rings are 2.9 inches, and the spacings between the second set of electrodes and the first drift ring, between the first and second drift rings and between the second drift ring and the beam landing electrode are all nominally 100 mils.

6. In a Schlieren dark field type light valve having an electrostatic electron optical system for imaging an electron beam object formed at a beam shaping aperture and sweeping said beam over a scanned raster are while maintaining both beam magnification and focus over the entiire scanned area the improvement comprising;
   a deflection electrode assembly including a first set of four control electrodes having a length of about 1.2 to 1.8 times the interelectrode spacing between said electrodes of said first set, a cylindrical electrode and a second set of four deflection electrodes having a length of about 1.0 to 1.6 times the interelectrode spacing between said electrodes of said second set, said cylindrical electrode being along an axis of said deflection electrode assembly and located between said first and second sets of four electrodes, said cylindrical electrode having a diameter of about 6 to 10 times thed interelectrode spacing of said first set of four electrodes, each of said sets of four electrodes having a pair of vertical deflection plates and a pair of horizontal deflection plates; the spacing fromt he beam shaping aperture to the entrance of the first set of electrodes being about 1.25 to 6.25 times the interelectrode spacing of said first set of four electrodes, the spacing from the exit of said first set of electrodes to the entrance of said second set of electrodes being about 3 to 6 times the interelectrode spacing of said first set of electrodes;

means for applying incremental d.c. voltages to the vertical deflection plates of said first set and equal but opposite polarity incremental d.c. voltages to the horizontal deflection plates of said first set;

means for applying incremental d.c. voltages of polarity opposite the polarity of said first set to the vertical deflection plates of said second set and equal but opposite polarity incremental d.c. voltages to the horizontal deflection plates of said second set;

a mutli-element drift ring assembly including at least a first drift ring and a second drift ring axially aligned with said deflection electrode assembly, the diameters of the first and second drift rings being 1.1 to 1.25 times the interelectrode spacing of said second set of electrodes; and a beam landing electrode axially displaced from said electrode assembly.

7. The light valve as described in claim 6 further comprising an electron gun axially aligned with said deflection electrode assembly for generating an electron beam directed toward said beam landing electrode, said electron gun having a snout electrode at about $+5000$ volts d.c., said first set of electrodes operating at a nominal $+7000$ volts d.c. with incremental voltages of $\alpha 60$ volts on the horizontal deflection plates and $-60$ volts on the vertical deflection plates, said second set of electrodes operating at a nominal $+30$ volts d.c. with 0 volts on the horizontal deflection plates and $+60$ volts on the vertical deflection plates, said cylindrical electrode operating in the range on 7000 to 9000 volts d.c., the first drift ring operating in the range of $+4000$ to 5000 volts d.c. and the second drift ring operating in the range of $+5000$ to 7000 volts d.c., and the beam landing electrode operating in the range of $+4000$ to 6000 volts d.c.

* * * * *

UNITED STATES PATENT AND TRADEMARK OFFICE
CERTIFICATE OF CORRECTION

PATENT NO. : 4,779,024
DATED : 10/18/88
INVENTOR(S) : Alfred G. Roussin

It is certified that error appears in the above-identified patent and that said Letters Patent is hereby corrected as shown below:

Column 8, Line 54, delete "rirst", and insert therefor --first--.

Column 9, Line 35, delete "maintainingboth", and insert therefor --maintaining both--.

Column 10, Line 51, delete "are", and insert therefor --area--.

Column 12, Line 11, delete "a60", and insert therefor --+60--.

Signed and Sealed this

Eighteenth Day of April, 1989

Attest:

DONALD J. QUIGG

*Attesting Officer*  *Commissioner of Patents and Trademarks*